(No Model.)

A. W. WALTER.
ADJUSTABLE SAW TOOTH.

No. 435,657. Patented Sept. 2, 1890.

WITNESSES:
Harry Frease
Harry P. Reed

Anton W. Walter INVENTOR

BY
Fred N. Bond
ATTORNEY

UNITED STATES PATENT OFFICE.

ANTON W. WALTER, OF CANTON, OHIO.

ADJUSTABLE SAW-TOOTH.

SPECIFICATION forming part of Letters Patent No. 435,657, dated September 2, 1890.

Application filed March 24, 1886. Serial No. 196,334. (No model.)

*To all whom it may concern:*

Be it known that I, ANTON W. WALTER, a citizen of the United States, residing at Canton, in the county of Stark and State of Ohio, have invented certain new and useful Improvements in Adjustable Saw-Teeth; and I do hereby declare that the following is a full, clear, and exact description of the same, reference being had to the annexed drawings, making a part of this specification, and to the letters of reference marked thereon, in which—

Figure 1:
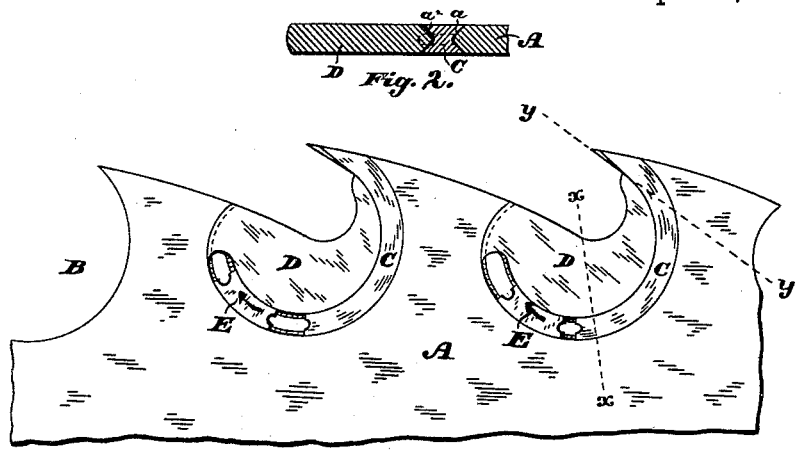
Figure 4:
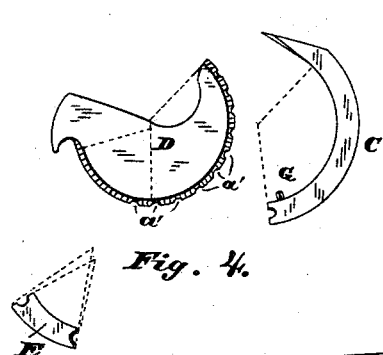
Figure 3:
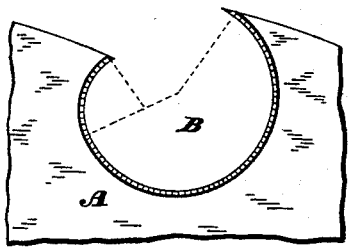
Figure 5:
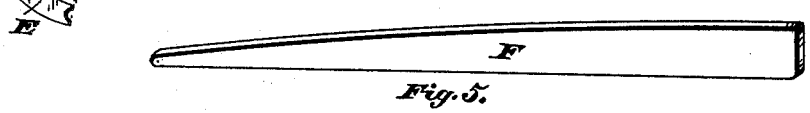
Figures 6, 8, 9:
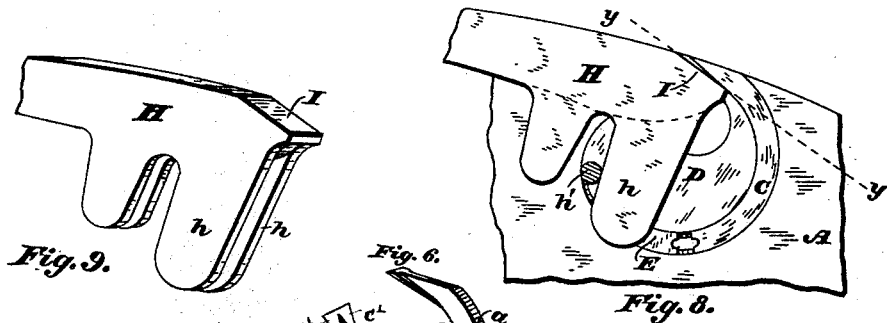
Figure 7:
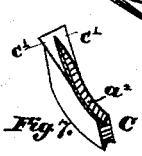

Figure 1 is a side elevation of a portion of a saw-blade, showing the teeth properly adjusted therein. Fig. 2 is a sectional view on line $x\ x$, Fig. 1. Fig. 3 is a side elevation of a portion of a saw-blade, showing the tooth and the different parts removed. Fig. 4 presents detached views of the tooth, the fastener, and the key or wedge. Fig. 5 is a view of the adjusting wedge or bar. Fig. 6 is a view of the front or cutting part of a tooth. Fig. 7 is an under side view of the front or cutting portion of a tooth. Fig. 8 is a side elevation showing the swage in proper position for use. Fig. 9 is a perspective view of swage.

The present invention has relation to adjustable saw-teeth; and its nature consists in the different parts and combination of parts hereinafter described, and particularly pointed out in the claims.

In the accompanying drawings, A represents the blade of a saw, which is provided with the recesses B at such places where it is desired to locate teeth. The edges of the recesses are formed V or U shaped, which is for the purpose of receiving the V or U shaped recess $a$ in the back of the tooth C, as shown in Fig. 2. The front or forward part of the tooth C is also provided with a V or U shaped recess or groove, which extends to the cutting-edge of the tooth, which edge is formed by the walls of the groove being turned outward and is of greater length than the thickness of the body of the tooth. This groove or recess is for the purpose of receiving the fastener D, as shown in Fig. 2. The tooth C is substantially of the form shown in the drawings and is the segment of a circle of any desired diameter and is securely held in proper position, as hereinafter described.

The fastener D may be substantially of the form shown in the drawings, the portion of said fastener fitting against the tooth C being the segment of a circle having the same diameter as the front or forward part of the tooth C. The portion of the fastener D which fits against the blade A is the segment of a circle of less diameter than that portion fitting against the tooth C. The recess B is formed having two segments of circles, each circle having a different diameter, which is for the purpose of preventing the tooth C, together with the fastener D, from being forced backward in a circular path while in use.

The tooth C and the fastener D are securely held in the recess B by means of the key or wedge E, which may be driven forward by means of the adjusting wedge or bar F, which will be placed with its pointed end against the suitably-notched end of said wedge E or in any other manner. The portion of the fastener D abutting against the plate or blade A is provided with a V or U shaped recess, which receives the edge of the plate or blade A, as shown in Fig. 1. The back or rear end of the tooth C may be provided with the pin G, which enters one of the recesses $a'$, these recesses $a'$ being located at suitable intervals on the edge of the fastener D. It will be seen that when the tooth C wears away the key or wedge E may be loosened by forcing it in the direction of the arrow, as shown in Fig. 1, the pin G can be removed from one of the recesses $a'$, and the tooth brought forward.

When it is desired to remove the tooth C from the saw-blade, the wedge E is forced in the direction of the arrow, and as it approaches the smaller arc of the recess B its clamping force against the fastener is diminished, consequently diminishing the clamping force exerted by the fastener upon the tooth, which may now be removed with the wedge and the fastener D from the saw-blade by sliding them in the direction of their length.

When it is desired to insert the tooth in position in the saw-blade, the said tooth, the fastener, and the wedge are assembled together in the same relation with the wedge at a distance from the lower end of the tooth, as shown in Fig. 1 at the left-hand side thereof, and when so assembled the parts may be easily slid in position and the wedge then moved toward the lower end of the tooth, which will thus fasten said tooth in position. The cutting-edge of the tooth C is in line with what is known as the "pitch-line," said pitch-line being indicated by the line $y$ $y$, Fig. 1, and that line always remains the same, which result is accomplished by my peculiar manner of swaging, which will be more fully explained hereinafter. The under side or edge of the tooth C is also in line with the pitch-line.

In order to swage the tooth C, the swage-bar H is placed in the position shown in Fig. 8, and is held in the desired position by means of the arms $h$ and the pin or bar $h'$ of such size that it may be passed transversely through the space between the fastener D and the blade, which is placed behind or in rear of the arms $h$, as shown in Fig. 8. It will be seen that by this peculiar manner of adjusting the swage-bar H the swaging will be done from the bottom or under side of the tooth, thereby swaging out the portions of the tooth C on the sides of the V or U shaped recess or groove $a^2$, thereby always keeping the same pitch-line and causing all the teeth to work or cut uniform. The swaging or turning out of the portions of the tooth on the sides of the V or U shaped recess or groove $a^2$ causes the metal which formed the walls of the groove to form the cutting-edge of the tooth without disturbing the molecular disposition of the same to any considerable extent, such disturbance as there is being confined to the middle portion of the cutting-edge where the tooth is least subject to wear. It will be understood that the hammering and filing are done on the top or upper side of the tooth.

Heretofore saw-teeth have been swaged and filed from the top or front portions of the teeth, thereby changing the pitch-line of the teeth, while by swaging the teeth from the under side by my peculiar manner the swaging can be done with much less labor and also greater accuracy can be accomplished.

The swage-bar H is provided with the leveled portion I, which is adjusted to receive the bottom or under side of the teeth C, as shown in Fig. 8. It will also be seen that as the teeth C are adjustable in a circular path the pitch-line will at all times be the same. By swaging the point of the tooth in the manner described the metal is spread on each side of the groove $a^2$, forming the parts $c'$, Fig. 7. This manner of constructing the tooth with a groove or recess $a^2$ in its under side enables the tooth to be made of a thin plate, and the cutting-edge to be reduced, when required, from a higher to a lower number by swaging in such a way that a portion of the vertical side of the plate becomes a part of the horizontal cutting-edge. This enables a saw-tooth made of No. 7 steel, for instance, to be reduced to a cutting-edge No. 3 or thereabout. By this form of tooth, therefore, it will be seen that a light blade can be made to carry a broad-faced cutting-tooth by simply swaging it out at the sides without materially increasing its length.

Having now fully described my invention, what I claim as new, and desire to secure by Letters Patent, is—

1. The combination of the plate or blade A, provided with the recess B, said recess being a segment of circles having different diameters, the fastener D, provided with a series of recesses A' on the side next to the tooth, the tooth C, provided with the pin G, for engaging said recesses, and the key or wedge E, substantially as and for the purpose specified.

2. The combination of the plate or blade A, formed with the recess B, the same being the segment of circles having different diameters, the tooth C, formed of the segment of a circle and having the groove $a^2$ in its under side and swaged from such side to bring the cutting-edge of the tooth in line with the pitch-line, the fastener D, engaging with the plate or blade and a projection upon the tooth, and the key E, interposed between and engaging with the fastener D and blade A and holding the parts in place, substantially as described.

3. The combination, with a recessed saw-plate and a fastening device, of the insertible tooth provided along its inner edge with a longitudinal groove extending approximately to its cutting-edge and having the walls of the groove turned outwardly at its point to form a straight cutting-edge longer than the thickness of the body of the tooth, substantially as set forth.

In testimony that I claim the above I have hereunto subscribed my name in the presence of two witnesses.

ANTON W. WALTER.

Witnesses:
FRED W. BOND,
J. C. SKELTON.